United States Patent [19]

Simon

[11] 4,255,698

[45] Mar. 10, 1981

[54] PROTECTION OF BATTERIES

[75] Inventor: Henry I. Simon, Los Altos, Calif.

[73] Assignee: Raychem Corporation, Menlo Park, Calif.

[21] Appl. No.: 6,773

[22] Filed: Jan. 26, 1979

[51] Int. Cl.³ .......................... H02J 7/04; H02H 5/04
[52] U.S. Cl. ................................. 320/35; 338/22 R; 361/106; 320/51
[58] Field of Search ........................ 320/35, 36, 20, 2; 338/22, 31; 361/106

[56] References Cited

U.S. PATENT DOCUMENTS

| | | | |
|---|---|---|---|
| 2,157,139 | 5/1939 | Mirick | 320/35 |
| 3,025,455 | 3/1962 | Jonsson | 320/35 X |
| 3,171,076 | 2/1965 | Medlar | 320/35 X |
| 3,243,753 | 3/1966 | Kohler | |
| 3,518,524 | 6/1970 | Roszyk | 320/36 X |
| 3,667,026 | 5/1972 | Bogut et al. | 320/39 X |
| 4,091,267 | 5/1978 | Grant | 338/22 R X |

Primary Examiner—Robert J. Hickey
Attorney, Agent, or Firm—Lyon & Lyon

[57] ABSTRACT

Improved methods of battery charge and/or discharge control make use of an electrical device which is connected in series with the cell or cells of the battery and which is preferably a permanent part of the battery, so that when the battery terminals are connected in order to charge or discharge the battery, the device provides an automatic guard against excessive battery temperatures and/or current discharges. The device comprises a PTC element which is preferably composed of a conductive polymer composition, and which is in a low resistance state under normal operating conditions but which changes to a high resistance state (and thus reduces the charging current or the discharge current) when the temperature and/or current become excessive.

50 Claims, 3 Drawing Figures

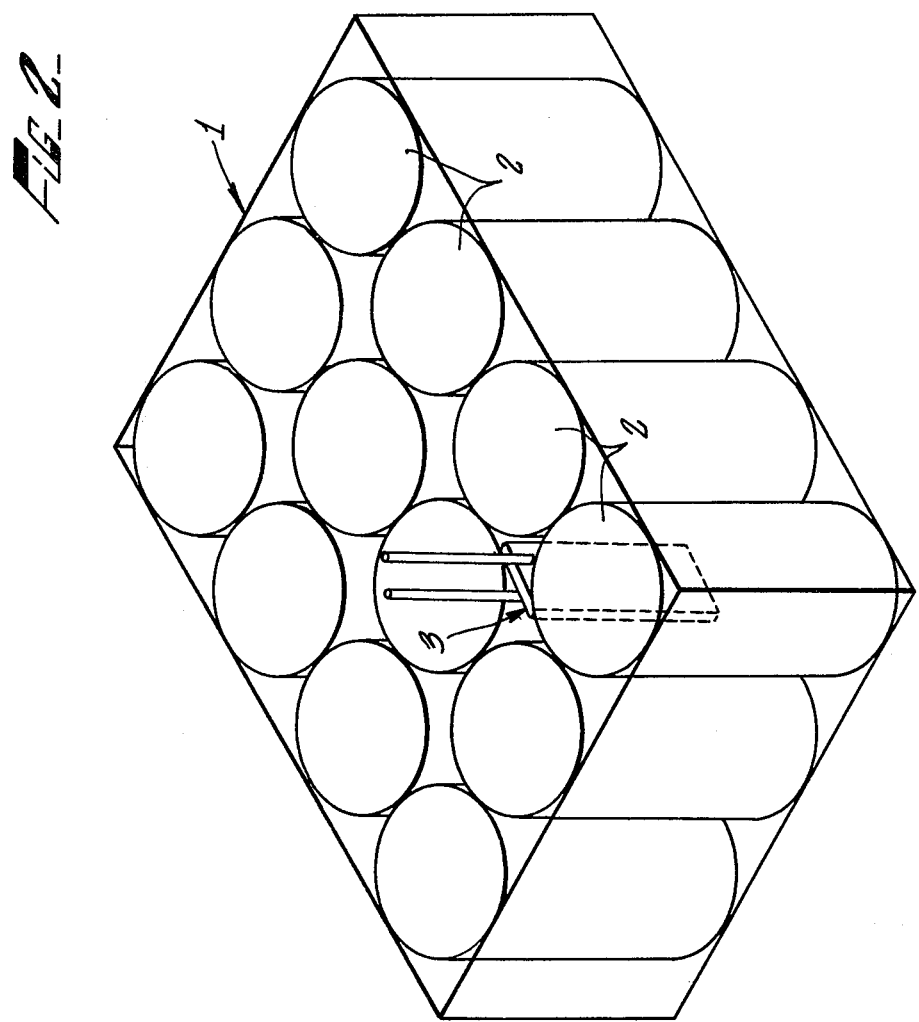

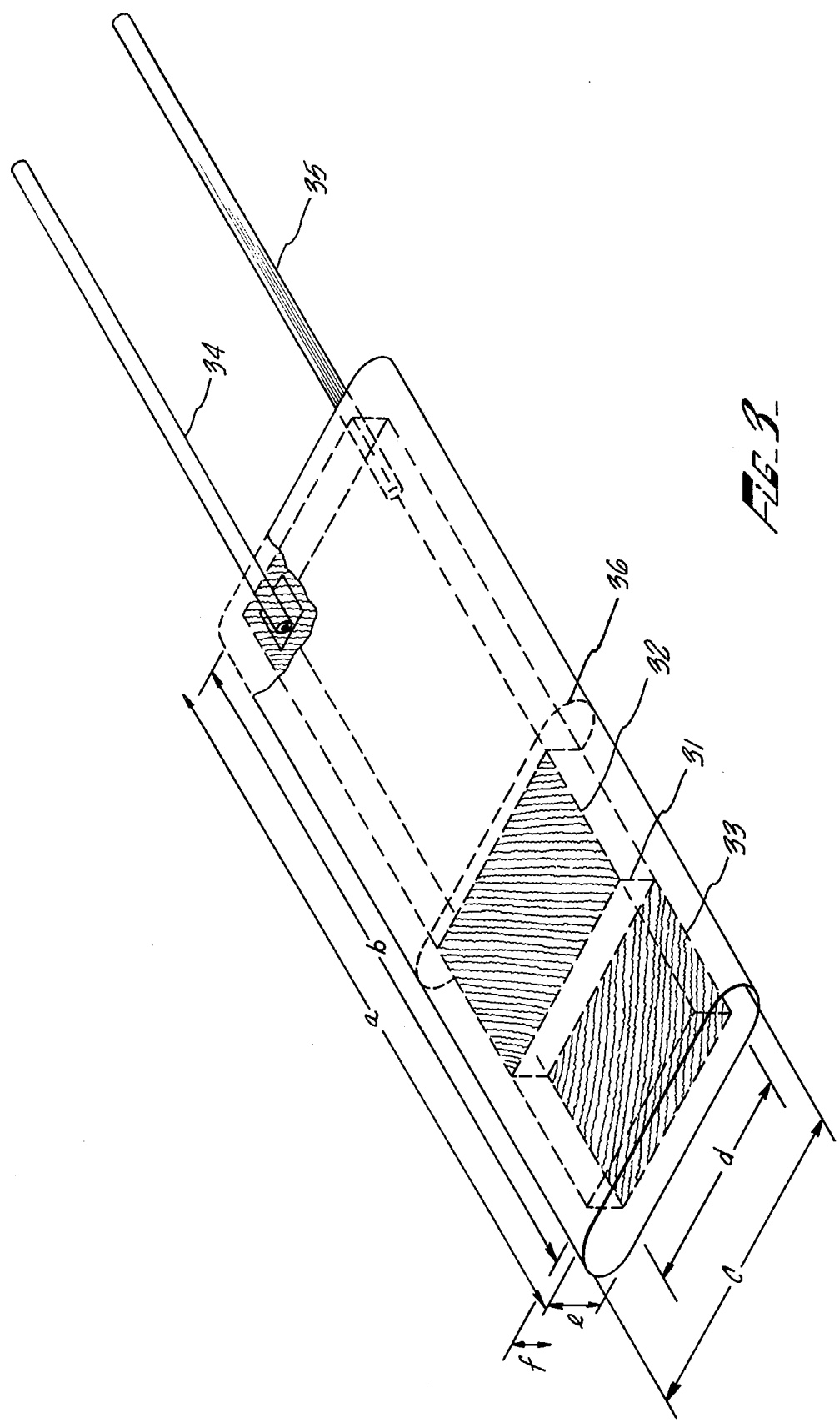

PROTECTION OF BATTERIES

BACKGROUND OF THE INVENTION

1. Field of the Invention

This invention relates to the protection of batteries from damage due to excessive temperatures generated during charging or discharging and to batteries which are "intrinsically safe".

2. Summary of the Prior Art

When a battery is discharged, and in the case of a secondary battery, also when it is recharged and the battery is approaching a fully charged state, heat is generated within the battery. The higher the current drawn from the battery, or the higher the charging current, the greater the amount of heat generated and the greater the danger that one or more of the components of the battery will be damaged. Batteries do not normally contain any component to prevent excessive currents being drawn from them, though it is known to include a thermal fuse or a thermostat in a battery for this purpose. On the other hand, when a secondary battery is to be recharged by a period of rapid-charging followed by a period of trickle-charging, it is common practice for the battery to incorporate a PTC resistor (i.e. a resistor whose resistance rises with temperature) which is in thermal contact with the cells, e.g. nested between them, and which, when the battery is being charged, forms part of a separate control circuit which contains electronic switching apparatus such that when the resistance of the resistor increases beyond a specific value (as a result of increased battery temperature), the current in the charging circuit is reduced by this control circuit from the rapid-charging level to the trickle-charging level. Charging procedures of this kind are described for example in U.S. Pat. No. 3,667,026. While such procedures in general give satisfactory control over the battery-charging process, they involve the use of excessively complex and expensive electronic switching apparatus.

SUMMARY OF THE INVENTION

I have discovered an improved method of battery charge and/or discharge control which makes use of an electrical device which is connected in series with the cell or cells of the battery and which is preferably a permanent part of the battery, so that when the battery terminals are connected in order to charge the battery or to draw current from the battery, the device provides an automatic guard against excessive battery temperatures and/or current discharges. The electrical and thermal characteristics of the device can be selected in accordance with the type of battery and the way in which it is required to be operated and to be charged.

In one aspect the invention provides a method of recharging a battery comprising one or more secondary cells and having a capacity of C ampere hours, which method comprises passing current through the cell or cells while they are part of a circuit which also comprises a source of DC power and an electrical device which (i) is connected in series with the cell or cells of the battery;

(ii) is in thermal contact with at least one cell of the battery;

(iii) comprises a PTC element and at least two electrodes which are placed so that current flows through said PTC element; and (iv) has an electrical power/temperature relationship and is capable of dissipating heat at a rate such that (A) when the current is initially passed through the circuit, the circuit is in a rapid-charging condition in which there is a rapid-charging current through the cell or cells of the battery of at least 0.25C, and there is a stable equilibrium between the rate at which the device generates heat by $I^2R$ heating and the rate at which heat is lost from the device; and (B) when the rapid-charging current has recharged the cell or cells to a certain state of charge and in consequence the cell or cells and the device have reached elevated temperatures, the rate at which the device generates heat by $I^2R$ heating exceeds the rate at which heat is dissipated from the device and thus causes the temperature and the resistance of the device to rise rapidly, and thereafter the circuit reaches a trickle-charging condition, in which condition there is a trickle-charging current through the cell or cells which is less than half said rapid-charging current and is from 0.03C to 0.2C amps and in which condition the rate at which the device generates heat by $I^2R$ heating is equal to the rate at which heat is dissipated from the device, said trickle-charging condition being maintained so long as current continues to pass through the circuit.

In another aspect the invention provides a battery comprising one or more secondary cells and an electrical device which (i) is connected in series with the cell or cells of the battery;

(ii) is in thermal contact with at least one cell of said battery;

(iii) comprises a PTC element and at least two electrodes which are placed so that, when the battery is being recharged, current flows through said PTC element; and (iv) has an electrical power/temperature relationship and is capable of dissipating heat at a rate such that (A) when the battery has been discharged and is being recharged in a recharging circuit, with the battery being placed in still air at 20° C., there is at least one rapid-charging current through the cell or cells of the battery which is in the range 0.25C to 4C amps, where C is the capacity of the battery in amp. hours, and which produces in the circuit a rapid-charging condition in which there is a stable equilibrium between the rate at which the device generates heat by $I^2R$ heating and the rate at which heat is lost from the device; and (B) when said rapid-charging current has recharged the cell or cells to a certain state of charge and in consequence the cell or cells and the device have reached elevated temperatures, the rate at which the device generates heat by $I^2R$ heating exceeds the rate at which heat is dissipated from the device and thus causes the temperature and the resistance of the device to rise rapidly, and in consequence the circuit thereafter reaches a trickle-charging condition, in which condition there is a trickle-charging current through the cell or cells which is less than half said rapid-charging current and is from 0.2C to 0.3C amps, and in which condition the rate at which the device generates heat by $I^2R$ heating is equal to the rate at which heat is dissipated from the device.

In another aspect the invention provides a battery comprising one or more cells and an electrical device which (i) is connected in series with the cell or cells of said battery;

(ii) is in thermal contact with at least one cell of said battery;

(iii) comprises a PTC element and at least two electrodes which are placed so that, when the battery is being discharged, current flows through said PTC element; and (iv) has an electrical power/temperature relationship and is capable of dissipating heat at a rate such that if said battery is placed in still air at 20° C. and is used as a source of power, there is a critical current, $i_{crit}$, which is such that when the current drawn from the battery is below $i_{crit}$, there is a stable equilibrium between the rate at which the device generates heat by $I^2R$ heating and the rate at which heat is dissipated from the device, and when the current drawn from the battery is above $i_{crit}$, the rate at which the device generates heat by $I^2R$ heating exceeds the rate at which heat is dissipated from the device and thus causes the temperature and the resistance of the device to rise rapidly until the device reaches a high temperature stable equilibrium state in which (a) the rate at which the device generates heat by $I^2R$ heating is equal to the rate at which heat is dissipated from the device, and (b) the current drawn from the battery is less than 0.5C amps.

BRIEF DESCRIPTION OF THE DRAWINGS

The invention is illustrated in the accompanying drawings, in which

FIG. 2 is a diagrammatic perspective view of a battery in accordance with the invention; and FIG. 3 is a perspective view, partly cut-away, of the electrical device in the battery of FIG. 2.

DETAILED DESCRIPTION OF THE INVENTION

Figure 1:
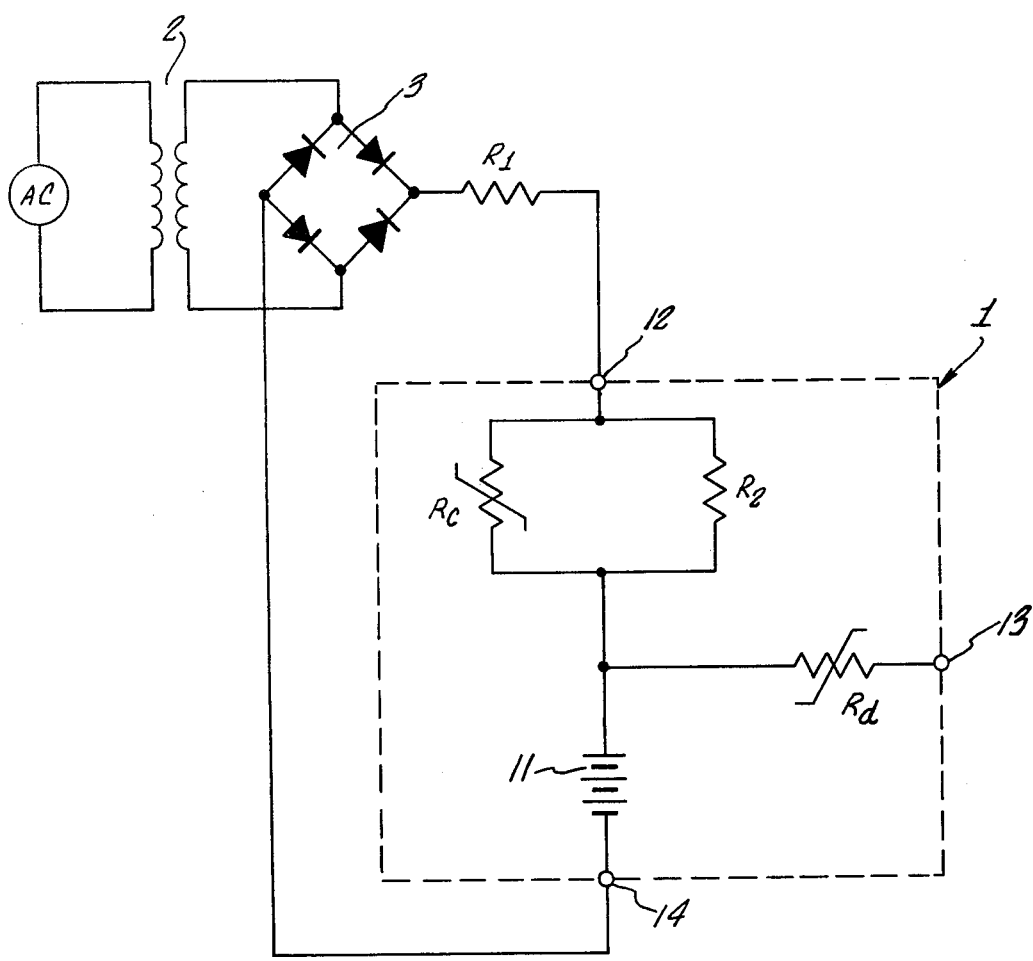
FIG. 1 is a circuit diagram for a battery which is being charged in accordance with the invention.

The electrical devices containing PTC elements which are used in the present invention are preferably devices of the type generally described in copending and commonly assigned Application Ser. No. 965,344 (Middleman et al) entitled "Circuit Protection Devices comprising PTC elements" and preferably comprise an oxygen barrier layer as described in commonly assigned Application Ser. No. 965,345 (Middleman et al), now abandoned in favor of a continuation-in-part application filed Nov. 30, 1979, entitled "PTC Devices comprising Oxygen Barrier Layers"; the PTC elements are preferably composed of a PTC composition as described in copending and commonly assigned Application Ser. No. 965,343 (van Konynenburg et al) entitled "Low Resistivity PTC Compositions". The disclosures of these three applications, all of which were filed Dec. 1, 1978, are incorporated herein by reference.

The invention is particularly useful for batteries which comprise a plurality of cells and in which the device is placed between the cells, preferably in a cavity between three or more cells, and is permanently connected so that it is connected in series with the cells between the terminals of the battery. The invention will chiefly be described by reference to such batteries, but it is to be understood that the invention is also applicable to single cell batteries and to methods of charging in which the device is not an integral part of the battery but is placed in thermal contact with the cell or cells during the charging process.

The device provides the desired protective effect by changing from a low resistance state to a high resistance state, and this change can be caused by a decrease in the rate at which the heat generated within the device can be dissipated, or by an increase in the current passing through the device, or by a combination of the two. When the device is being used to protect a battery during charging, the change is caused by an increase in the temperature of the cells, which decreases the rate at which heat can be dissipated from the device. When the device is being used to protect a battery during discharge, the change can be caused by a combination of an increase in current and an increase in the temperature of the cells as a result of that increase in current. However, the device will also serve to protect the battery against a very high current which is drawn from the battery, e.g. as a result of a direct short between the terminals of the battery, before there is any substantial increase in the temperature of the cells. In addition, the device will prevent substantial current being drawn from the battery when the battery has been heated externally to unusually high temperatures.

As noted above, the electrical and thermal characteristics of the device should be selected in accordance with the type of battery and the way in which it is required to be operated and/or recharged. Thus with primary batteries (which cannot be recharged) the device functions only as a protective device when the battery is being discharged. With secondary batteries, the device can be connected so that it is in series with cells both when the battery is being charged and when it is being discharged (in which case the battery will generally comprise only two terminals), or only when the battery is being charged or only when the battery is being discharged (in which case the battery will generally have three terminals, one pair being used for charging the battery and another pair being used when the battery is supplying power). It is also possible for a secondary battery to comprise two protective devices, one of which is connected in series with the cells when the battery is being charged, and the other of which is connected in series with the cells when the battery is being discharged.

When the device functions to protect the battery during charging, it must remain in the low resistance state (and therefore pass the rapid-charging current) while the battery is in a low state of charge, but reduce the rapid-charging current to a trickle-charging current when the battery has reached a level of charge such that further passage of the rapid-charging current would cause overheating of the cells. The rapid-charging current used to recharge the cells will depend not only on the chemical reactions involved in the charging process and the materials from which the cell is constructed, but also on the preferred compromise between a short charging cycle and a long service life. Thus identical batteries might by charged at a rapid-charging current of C amps or less (where C is the capacity of the battery in ampere-hours) when a charging time of about 1 hour or more was acceptable and a long service life was desired, and at a substantially greater rapid-charging current, e.g. of 2C amps or more, when the advantages of a shorter charging time were deemed to outweigh the greater resulting deterioration of the battery each time it was recharged (and consequent shorter service life). The rapid-charging currents employed in practice are always at least 0.25C and almost always less than 10C. In most situations, the rapid-charging current is at least 0.5C amps, typically 0.75C to 4C amps, preferably C to 3C amps.

With the materials currently being used for the electrodes, separators etc. in secondary batteries, the electrical and thermal characteristics of the device should be such that the rapid-charging current is reduced to a trickle-charging current when the cell temperature, and in consequence the temperature around the device ($T_{crit}$), are in the range of 40° to 75° C., generally 40° to 50° C. However, it is to be expected that future improvements in such materials will permit higher cell temperatures to be reached without substantial damage to the battery.

When the increase in cell temperature causes the rate at which the device generates heat by $I^2R$ heating to exceed the rate at which heat is lost from the device, the temperature and the resistance of the device rise rapidly, thus causing a sharp reduction in the current in the charging circuit. The cells will then begin to cool, and the temperature and the resistance of the device will fall slowly until a new equilibrium condition is established in which the rate at which the device generates heat by $I^2R$ heating is equal to the rate at which heat can be dissipated from the device. Since charging of the battery is not complete when the device changes from the low resistance state to the high resistance state, the trickle-charging current should be 0.03C to 0.2C amps, preferably 0.05C to 0.2C amps, especially 0.05C to 0.1C amps; when an unusually low rapid-charging current, below 0.4C amps, is used, the trickle-charging current should be less than half the rapid-charging current. In the trickle-charging condition, the temperature of the cells will be substantially lower than it was at the end of the rapid-charging period, and it is, therefore, important that the device should remain in the high resistance state so long as current continues to pass through the circuit, although the temperature round it is lower than it was when the change from the low resistance state to the high resistance state took place, i.e. that the device should be "latched", as explained in detail in the Middleman et al. application entitled "Circuit Protection Devices comprising PTC Elements" which is referred to above.

When the device functions to protect the battery during discharge as well as during charging, then it will remain in the low resistance state when the current drawn from the battery is less than the rapid-charging current which it will pass, which will, therefore, generally be in the range of 0.25C to 2C amps. When the device functions solely to protect the battery during discharge, it is designed to change to the high resistance state when the current drawn from the battery exceeds a preselected value which is referred to herein as $i_{crit}$. The value of $i_{crit}$ is usually between C and 10C amps and for many batteries is between 1.5C and 2.5C amps, e.g. 1.8C to 2.2C. In general the device should be designed so that once it has changed to the high resistance state and thus reduced the current drawn from the battery to less than 0.5C, it will remain in a high resistance state so long as current continues to flow in the circuit, i.e. the device will be "latched". Preferably the reduced current drawn from the battery is less than 0.4C. It is important to note that $i_{crit}$ is measured under steady state conditions. Currents substantially greater than $i_{crit}$ can be drawn from the battery for limited periods of time, and this is important in connection with the production of "intrinsically safe" batteries, as discussed later in this specification.

In defining the electrical power/temperature relationship of the devices in the batteries of the invention, reference is made above to the battery being placed in still air at 20° C. It is to be understood, however, that this is simply for the purpose of definition, since the thermal characteristics of the device will depend in part on the medium surrounding the battery, and that the batteries can be used and/or recharged in any suitable environment.

As noted above, the devices used in the present invention are preferably devices as generally described in the Middleman et al. application entitled "Circuit Protection Devices comprising PTC elements" which is referred to above. It is important to note, however, that although the devices used in the present invention will usually give rise to a Switching Ratio of at least 10 when placed in the standard circuit and standard thermal environment defined in that application, the Switching Ratio of a circuit in which a battery is being recharged in accordance with the method of the present invention will not necessarily be at least 10, since such a Switching Ratio might result in a trickle-charging current which was lower than desired. For example, when the rapid-charging current is relatively low, e.g. less than 1.5C amps, for example C amps, the Switching Ratio of the charging circuit will usually be less than 10, for example 4 to 9.

The PTC element of a device for use in the present invention will generally be composed of a PTC conductive polymer composition which has a resistivity of less than 10 ohm.cm, preferably less than 4 ohm.cm, at 20° C. and/or (when the device protects the battery during charging) when the battery is being recharged in the rapid-charging condition. The resistivity of the composition will generally be at least $10^4$ ohm.cm when the device is in the high resistance state, e.g. when a battery is being recharged and the circuit is in the trickle-charging condition. The composition will generally be cross-linked. Generally the devices should function so as to prevent the cells from heating to temperatures greater than 40°-60° C., and the PTC compositions should therefore generally have switching temperatures in the range of 40° to 75° C.; such compositions can be based on crystalline polymers having melting points in the range of 40° to 75° C., and excellent results have been obtained using polycaprolactone as the polymer. The shape of the PTC element and the electrical connections to it will generally be such that the current flows through the element over an area of equivalent diameter d with an average path length t such that d/t is at least 2, preferably at least 10. The resistance of the device at 20° C., and/or at the temperature of the device when the device protects the battery during charging and the battery is being recharged in the rapid-charging condition, will generally be less than 1 ohm., and, when the device protects the battery during charging, less than $0.1 \times R_L$, where $R_L$ is the resistance of the circuit in series with the device.

When the device is being used to protect the battery during charging, the device will be heated, during the period following the change from the low resistance state to the high resistance state, to a temperature which is higher than the temperature of the device when the circuit is in the trickle-charging condition, the latter temperature being referred to herein as $T_{d\ latch}$. It is desirable that resistance of the device at $T_{d\ latch}$ should be less than the resistance of the device at all temperatures between $T_{d\ latch}$ and $(T_{d\ latch}+10)°$C. and preferably less than the resistance of the device at all temperatures between $T_{d\ latch}$ and $(T_{d\ latch}+50)$ °C.

Especially when the device is used to protect the battery during charging, the electrical stability of the device should be such that it will continue to provide the desired protective effect throughout the useful life of the battery.

The capacity of a battery in ampere hours depends on the rate at which current is drawn from the battery and the ambient temperature. The battery capacities given in this specification are measured at the one-hour rate at an ambient temperature of 25° C.

Referring now to the drawings, FIG. 1 is a circuit diagram showing a secondary battery being charged in accordance with the invention. The battery 1 comprises a case which is indicated by the dotted lines, a plurality of secondary cells 11 and terminals 12, 13 and 14, terminals 12 and 14 being connected when the battery is being charged (as in the circuit shown) and terminals 13 and 14 being connected when the battery is being discharged. When the battery is being charged, PTC resistor $R_d$ is not part of the circuit but PTC resistor $R_c$ is connected in series with the cells; also shown is fixed resistor $R_2$ connected in parallel with $R_c$. PTC resistor $R_c$, which protects the battery during charging only, has a very low resistance at room temperature but a much higher resistance in the high resistance state, preferably a resistance such that, in the absence of $R_2$, the trickle-charging current is at the desired level. Resistor $R_2$ is required only if the resistance of $R_c$ in the high resistance state is so high that, in the absence of $R_2$, the trickle-charging current would be too low: if used, resistor $R_2$ has a resistance which is much higher than the resistance of $R_c$ in the low resistance state, but lower than the resistance of $R_c$ in the high resistance state. When the battery is being discharged, $R_c$ is not part of the circuit, but $R_d$ is connected in series with the cells and thus protects them during discharging. As with $R_c$, a fixed resistor can be placed in parallel with $R_d$. The charging circuit also comprises a source of AC Power, a transformer 2, a rectifier 3 and a fixed resistor $R_1$.

Referring now to FIG. 2, this shows a diagrammatically illustrated battery which comprises a case 1, cells 2, and a PTC device 3 which is placed in between the cells. The PTC device is illustrated in detail in FIG. 3. It comprises a PTC element 31 which is sandwiched between expanded metal electrodes 32 and 33 to which are attached leads 34 and 35 respectively. Insulating layer 36 surrounds and encapsulates the PTC element, the electrodes and the ends of the leads.

EXAMPLE

A device as illustrated in FIG. 3 was prepared. The PTC element contained 56 parts by weight of polycaprolactone (PCL 700 from Union Carbide), 42 parts by weight of carbon black (Furnex N765) and 2 parts by weight of antioxidant [an oligomer of 4,4'-thiobis (3-methyl-6-t-butyl phenol) with an average degree of polymerisation of 3-4, as described in U.S. Pat. No. 3,986,981]. The resistivity of the composition at 25° C. was about 2.5 ohm.cm. The electrodes and the leads were composed of nickel-coated copper and the insulating layer was composed of a cured epoxy resin. The device had been irradiated to a dosage of 20 megarads. The dimensions shown in FIG. 3 were: a=2.8 cm, b=2.5 cm, c=1.2 cm, d=1.0 cm, e=0.35 cm and f=0.17 cm. The device had a resistance at 25° C. of about 0.1 ohm.

This device was placed as shown in FIG. 2 between the cells of a battery comprising 12 nickel-cadmium (1.3 v) cells and having three terminals. The battery had a capacity of 0.45 amp. hours. The device was connected so that it was in series with the cells only when the battery was being charged. The battery was discharged and was then recharged in a circuit which was as illustrated in FIG. 1 except that fixed resistor $R_2$ and PTC resistor $R_d$ were not present. $R_1$ had a resistance of 15 ohms.

For the first 60 minutes, the rapid-charging current was about 0.44 amps and the resistance of the device remained low (less than 0.3 ohms). At that time, the temperature of the cells, and in consequence the temperature of the device had risen to about 45° C., and the device was no longer able to dissipate the heat generated within it by $I^2R$ heating. In consequence its resistance rose very rapidly to about 350 ohms, reducing the current to about 26 milliamps. The temperature of the device and the cells then dropped until an equilibrium trickle-charging condition was established in which the current was 43 milliamps and the resistance of the device was 177 ohms.

In describing the invention above, emphasis has been laid on protecting the battery itself from damage caused by excessive temperatures within the cells. However, when the device is connected between the discharge terminals of the battery, so that it is necessarily connected in series with the cells when current is being drawn from the battery, it can perform another very valuable function, which is to make the battery "intrinsically safe". The term "intrinsically safe" is used to describe a battery which will meet specified requirements which relate to the need to avoid damage to other electrical components connected to the battery (e.g. by specifying the maximum time for which a particular current can be drawn from the battery) and/or the need to avoid the creation of hazardous conditions (e.g. by specifying the maximum temperature which any part of the battery can reach, so as to avoid any danger of igniting explosive gases in the vicinity of the battery). These requirements will be different for different circumstances, but the characteristics of the device can be adjusted accordingly. Thus the device can be designed so that when an unusually high current is drawn from the battery, the device will function to reduce the current to a much lower level within a specified period of time, thus avoiding damage to current-sensitive electrical components connected to the battery; this may require the device to change to the high resistance state at a lower current, or require a more rapid reduction in the current than is needed in order to avoid damage to the battery itself. Similarly it may be desirable to design the device so that it will change to the high resistance state when it reaches a temperature which indicates that some part of the battery has reached a temperature which could cause a fire or an explosion, even though the cell temperature is still at a level which will not damage the cells. The device can also be designed so that it functions to reduce the rate of discharge of the battery when the current drawn from it exceeds a certain level, even though such a current level does not result in failure to meet an "intrinsically safe" requirement nor in a cell temperature which would damage the cells. For example if a circuit is designed to operate at a designated current, e.g. 0.1C, the device can be designed to change to the high resistance state if a fault condition causes the current to exceed twice the designated current, thus greatly reducing the rate of discharge of the battery. If the device is designed so that it does not latch, then it will revert to the low resistance state if the fault is removed.

It will be appreciated that in the situations just referred to, the value of $i_{crit}$ may lie inside or outside the range of C to 10C amps which is usually appropriate for a device which is designed to prevent the battery itself from damage.

I claim:

1. A method of recharging a battery comprising one or more secondary cells and having a capacity of C ampere hours, which method comprises passing current through the cell or cells while they are part of a circuit which also comprises a source of DC power and an electrical device which
    (i) is connected in series with the cell or cells of the battery;
    (ii) is in thermal contact with at least one cell of the battery;
    (iii) comprises a PTC element and at least two electrodes which are placed so that current flows through said PTC element; and
    (iv) has an electrical power/temperature relationship and is capable of dissipating heat at a rate such that
        (A) when the current is initially passed through the circuit, the circuit is in a rapid-charging condition in which there is a rapid-charging current through the cell or cells of the battery of at least 0.25C, and there is a stable equilibrium between the rate at which the device generates heat by $I^2R$ heating and the rate at which heat is lost from the device; and
        (B) when the rapid-charging current has recharged the cell or cells to a certain state of charge and in consequence the cell or cells and the device have reached elevated temperatures, the rate at which the device generates heat by $I^2R$ heating exceeds the rate at which heat is dissipated from the device and thus causes the temperature and the resistance of the device to rise rapidly, and thereafter the circuit reaches a trickle-charging condition, in which condition there is a trickle-charging current through the cell or cells which is less than half said rapid-charging current and is from 0.03C to 0.2C amps and in which condition the rate at which the device generates heat by $I^2R$ heating is equal to the rate at which heat is dissipated from the device, said trickle-charging condition being maintained so long as current continues to pass through the circuit.

2. A method according to claim 1 wherein the rapid-charging current is at least 0.5C amps.

3. A method according to claim 2 wherein the rapid-charging current is from 0.75C to 4C amps.

4. A method according to claim 1 wherein said trickle-charging current is from 0.05C to 0.2C amps.

5. A method according to claim 4 wherein said trickle-charging current is from 0.05C to 0.1C amps.

6. A method according to claim 1 wherein the temperature around the device, at the time when the rate at which the device generates heat first exceeds the rate at which heat is dissipated from the device, $T_{crit}$, is 40° to 75° C.

7. A method according to claim 6 wherein $T_{crit}$ is 40° to 50° C.

8. A method according to claim 1 wherein said device
    (a) comprises a PTC element which is composed of a PTC conductive polymer composition having a resistivity of less than 10 ohm.cm when said circuit is in said rapid-charging condition and through which current flows over an area of equivalent diameter d with an average path length t such that d/t is at least 2; and
    (b) has a resistance which is less than 1 ohm and less than $0.1 \times R_L$ ohm when said circuit is in said rapid-charging condition, where $R_L$ is the resistance of the circuit in series with the device.

9. A method according to claim 8 wherein said PTC conductive polymer composition has a resistivity of less than 4 ohm.cm when said circuit is in said rapid-charging condition.

10. A method according to claim 8 wherein said PTC conductive polymer composition has a resistivity of at least $10^4$ ohm.cm when said circuit is in said trickle-charging condition.

11. A method according to claim 8 wherein said ratio d/t is at least 10.

12. A method according to claim 1 wherein the temperature of said device when said circuit is in said trickle-charging condition is $T_{d\ latch}$ and the resistance of the device at $T_{d\ latch}$ is less than the resistance of the device at all temperatures between $T_{d\ latch}$ and $(T_{d\ latch}+10)$°C.

13. A method according to claim 12 wherein the resistance of the device at $T_{d\ latch}$ is less than the resistance of the device at all temperatures between $T_{d\ latch}$ and $(T_{d\ latch}+50)$°C.

14. A method according to claim 1 wherein said battery comprises only two terminals and said device is connected between said terminals so that it is connected in series with the cell or cells of the battery when it is being charged and when it is being discharged.

15. A method according to claim 1 wherein said battery comprises three or more terminals and said device is connected between said terminals so that it is connected in series with the cell or cells only when the battery is being charged.

16. A method according to claim 1 wherein said battery comprises a plurality of cells and said device is placed between the cells.

17. A method according to claim 1 wherein said cells are nickle-cadmium cells.

18. A battery comprising one or more secondary cells and an electrical device which
    (i) is connected in series with the cell or cells of the battery when the battery is being charged;
    (ii) is in thermal contact with at least one cell of said battery;
    (iii) comprises a PTC element and at least two electrodes which are placed so that, when the battery is being recharged, current flows through said PTC element; and
    (iv) has an electrical power/temperature relationship and is capable of dissipating heat at a rate such that (A) when the battery has been discharged and is being recharged in a recharging circuit with the battery being placed in still air at 20° C., there is at least one rapid-charging current through the cell or cells of the battery which is in the range 0.25C to 4C amps, where C is the capacity of the battery in amp. hours, and which produces in the circuit a rapid-charging condition in which there is a stable equilibrium between the rate at which the device generates heat by $I^2R$ heating and the rate at which heat is lost from the device; and (B) when said rapid-charging current has recharged the cell or cells to a certain state of charge and in consequence the cell or cells and the device have reached elevated temperatures, the rate at which the device generates heat by $I^2R$ heating exceeds the rate at which heat is dissipated from the device and thus causes the temperature and the resistance of the device to rise rapidly, and in consequence the circuit thereafter reaches a trickle-charging condition, in which condition there is a trickle-charging current through the cell or cells which is less than half said rapid-charging current and is from 0.2C to 0.03C amps, and in which condition the rate at which the device generates heat by $I^2R$ heating is equal to the rate at which heat is dissipated from the device.

19. A battery according to claim 18 wherein said rapid-charging current is 0.5C amps.

20. A battery according to claim 19 wherein said trickle-charging current is 0.05C to 0.1C amps.

21. A battery according to claim 18 wherein said rapid-charging current is C amps.

22. A battery according to claim 21 wherein said trickle-charging current is 0.05C to 0.2C amps.

23. A battery according to claim 18 wherein said rapid-charging current is 3C amps.

24. A battery according to claim 18 wherein said device (a) comprises a PTC element which is composed of a PTC conductive polymer composition having a resistivity of less than 10 ohm.cm when said circuit is in said rapid-charging condition and through which current flows over an area of equivalent diameter d with an average path length t such that d/t is at least 2; and (b) has a resistance which is less than 1 ohm and less than $0.1 \times R_L$ ohm when said circuit is in said rapid-charging condition, where $R_L$ is the resistance of the circuit in series with the device.

25. A battery according to claim 24 wherein said PTC conductive polymer composition has a resistivity of less than 4 ohm.cm when said circuit is in said rapid-charging condition.

26. A battery according to claim 25 wherein said PTC conductive polymer composition has a resistivity of at least $10^4$ ohm.cm when said circuit is in said trickle-charging condition.

27. A battery according to claim 24 wherein said ratio d/t is at least 10.

28. A battery according to claim 18 wherein the temperature of said device when said circuit is in said trickle-charging condition is $T_{d\ latch}$ and the resistance of the device at $T_{d\ latch}$ is less than the resistance of the device at all temperatures between $T_{d\ latch}$ and $(T_{d\ latch}+10)°C$.

29. A battery according to claim 28 wherein the resistance of said device when said circuit is in said trickle-charging condition is $T_{d\ latch}$ and the resistance of the device at $T_{d\ latch}$ is less than the resistance of the device at all temperatures between $T_{d\ latch}$ and $(T_{d\ latch}+50)°C$.

30. A battery according to claim 18 which comprises three or more terminals and said device is connected between said terminals so that it is connected in series with the cell or cells only when the battery is being charged.

31. A battery according to claim 18 wherein said rapid-charging current is in the range of 0.25C to 2C and said battery comprises only two terminals and said device is connected in series with at least one of the cells of the battery both when the battery is being charged and when it is being discharged.

32. A battery according to claim 18 which comprises a plurality of cells and said device is placed between the cells.

33. A battery according to claim 32 wherein said cells are nickel-cadmium cells.

34. A battery comprising one or more cells and an electrical device which (i) is connected in series with the cell or cells of said battery when current is being drawn from the battery;

(ii) is in thermal contact with at least one cell of said battery;

(iii) comprises a PTC element and at least two electrodes which are placed so that, when the battery is being discharged, current flows through said PTC element; and (iv) has an electrical power/temperature relationship and is capable of dissipating heat at a rate of such that if said battery is placed in still air at 20° C. and is used as a source of power, there is a critical current, $i_{crit}$, the device is in a low temperature stable equilibrium state in which there is a stable equilibrium between the rate at which the device generates heat by $I^2R$ heating and the rate at which heat is dissipated from the device, and when the current drawn from the battery is above $i_{crit}$, the rate at which the device generates heat by $I^2R$ heating exceeds the rate at which heat is dissipated from the device and thus causes the temperature and the resistance of the device to rise rapidly until the device reaches a high temperature stable equilibrium state in which (a) the rate at which the device generates heat by $I^2R$ heating is equal to the rate at which heat is dissipated from the device, and (b) the current drawn from the battery is less than 0.5C amps.

35. A battery according to claim 34 wherein $i_{crit}$ is between C and 10C amps, where C is the capacity of the battery in amp. hours.

36. A battery according to claim 35 wherein $i_{crit}$ is between 1.5C and 2.5C amps.

37. A battery according to claim 34 wherein said device (a) comprises a PTC element which is composed of a PTC conductive polymer composition having a resistivity of less than 10 ohm.cm at 20° C. and through which current flows over an area of equivalent diameter d with an average path length t such that d/t is at least 2; and (b) has a resistance which is less than 1 ohm at 20° C.

38. A battery according to claim 37 wherein said PTC composition has a resistivity of less than 4 ohm.cm at 20° C.

39. A battery according to claim 37 wherein said PTC composition has a resistivity of at least $10^4$ ohm.cm in said high temperature equilibrium state.

40. A battery according to claim 35 wherein the temperature of said device in said high temperature equilibrium state is $T_{d\ latch}$ and the resistance of the device at $T_{d\ latch}$ is less than the resistance of the device at all temperatures between $T_{d\ latch}$ and $(T_{d\ latch}+10)°C$.

41. A battery according to claim 40 wherein the resistance of the device at $T_{d\ latch}$ is less than the resistance of the device at all temperatures between $T_{d\ latch}$ and $(T_{d\ latch}+50)°C$.

42. A battery according to claim 34 which comprises a plurality of cells and said device is placed between the cells.

43. A battery according to claim 42 wherein said cells are nickel-cadmium cells.

44. A battery according to claim 34 which comprises three or more terminals and said device is connected between said terminals so that it is connected in series with the cell or cells only when current is being drawn from the battery.

45. A method according to claim 1, 3 or 8 wherein the current which passes through the device and the current which passes through the cell or cells are equal to each other when the circuit is in the rapid charging condition and when the circuit is in the trickle charging condition.

46. A method according to claim 1, 3 or 8 wherein the circuit comprises a fixed resistor in parallel with the device, said fixed resistor having a resistance which is higher than the resistance of the device when the circuit is in the rapid charging condition and which is lower than the resistance of the device when the circuit is in the trickle charging condition.

47. A battery according to claim 18, 19, 21, 23 or 24 wherein, when the battery is being recharged, the current which passes through the device and the current which passes through the cell or cells are equal to each other when the circuit is in rapid charging condition and when the circuit is in the trickle charging condition.

48. A battery according to claim 18, 19, 21, 23 or 24 which comprises a fixed resistor in parallel with the device, said fixed resistor having a resistance which is higher than the resistance of the device when the circuit is in the rapid charging condition and which is lower than the resistance of the device when the circuit is in the trickle charging condition.

49. A battery according to claim 34, 35, 36, 37, 38 or 41 wherein, when the battery is in still air at 20° C. and is used as a source of power, the current which passes through the device and the current which passes through the cell or cells are equal to each other when the current is below $i_{crit}$ and when the device is in the high temperature stable equilibrium state.

50. A battery according to claim 34, 35, 36, 37, 38 or 41 which comprises a fixed resistor in parallel with the device, said fixed resistor having a resistance which is higher than the resistance of the device in the low temperature stable equilibrium state and which is lower than the resistance of the device in the high temperature stable equilibrium state.

* * * * *